United States Patent

[11] 3,567,878

| [72] | Inventor | Glenn T. Randol<br>Mountain Park, 3E 2nd Ave. P. O. Box 275, Lock Lynn Heights, Md. 21550 |
|---|---|---|
| [21] | Appl. No. | 790,672 |
| [22] | Filed | Jan. 13, 1969 |
| [45] | Patented | Mar. 2, 1971 |

[54] SYNCHRONIZING CONTROL SWITCH ADAPTED FOR FRICTION CLUTCH USE
12 Claims, 10 Drawing Figs.

[52] U.S. Cl.............................................. 200/52, 192/.03
[51] Int. Cl............................................... H01h 35/00
[50] Field of Search......................................... 200/61.39, 153.14, 80, 52.11

[56] References Cited
UNITED STATES PATENTS

| 2,816,187 | 12/1957 | Smith | 200/61.39 |
| 3,080,025 | 3/1963 | Maurice | 200/61.39X |
| 3,264,560 | 8/1966 | Cheney | 200/153.14X |

*Primary Examiner*—Robert K. Schaefer
*Assistant Examiner*—M. Ginsburg

ABSTRACT: A synchronizing mechanism having an actuatable switch embodied in the flywheel-carried friction clutch used in motor vehicles and the like, for activating carburetor throttle-closing and opening means to modulate engine speed accordingly into synchronism with that of the clutch driven member prior to clutch lockup.

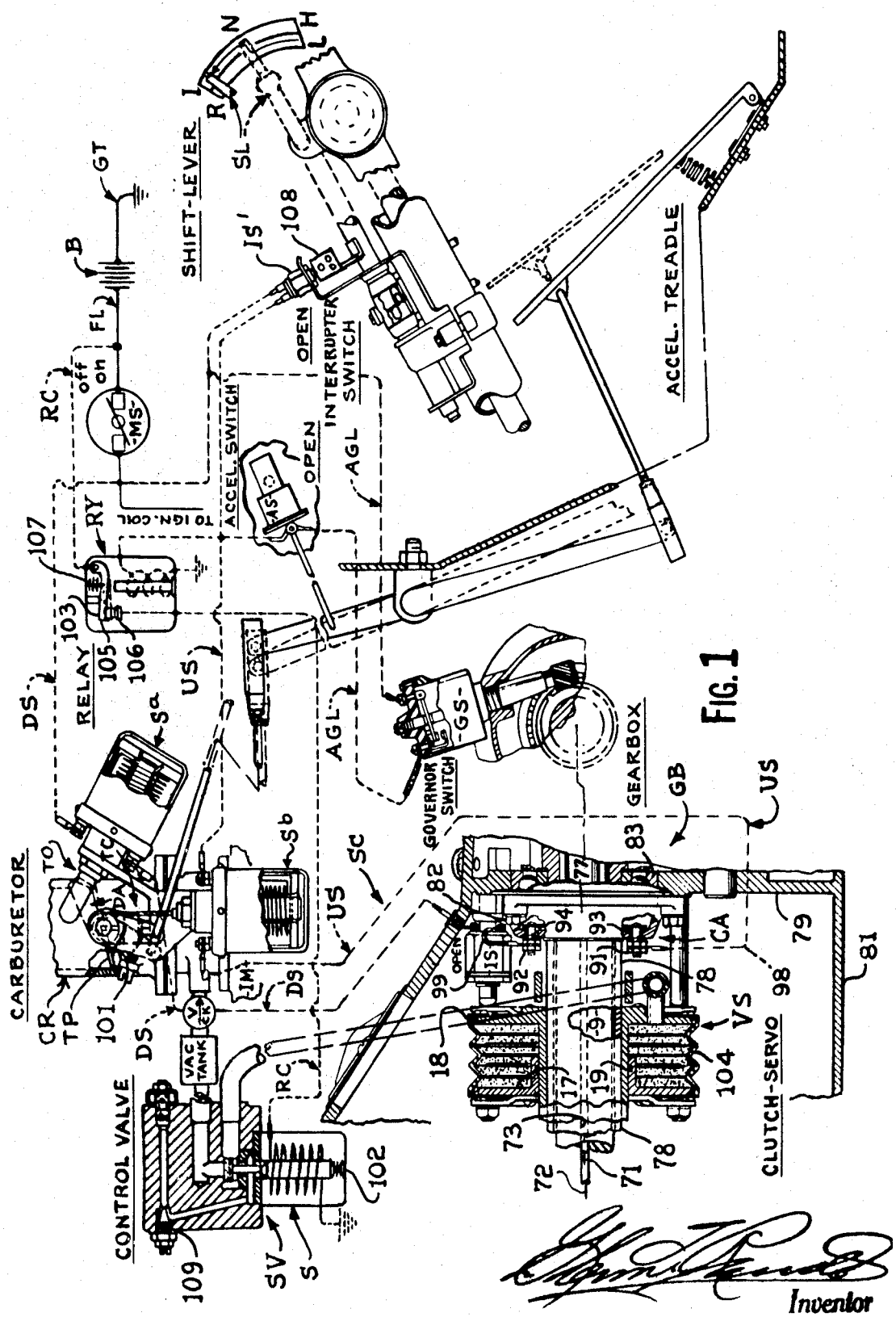

Inventor

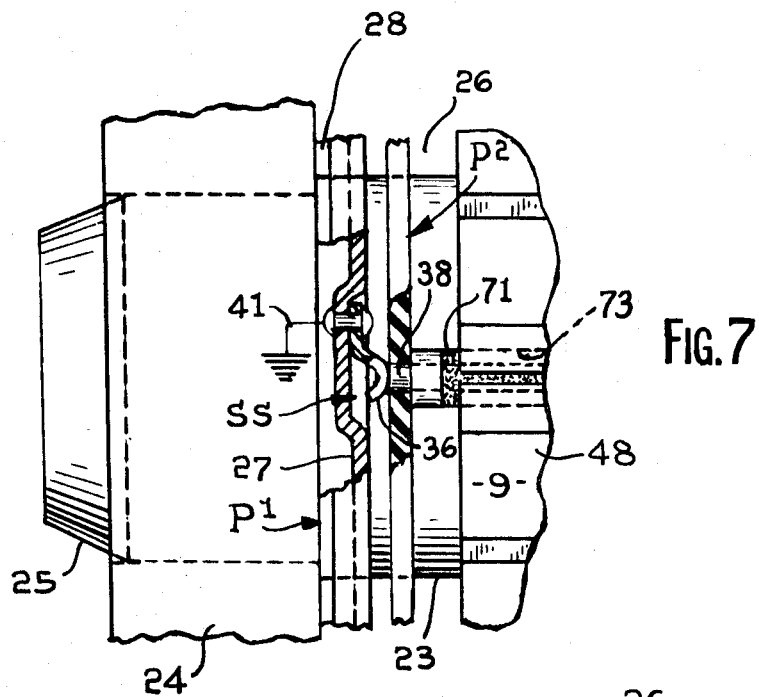
FIG. 7
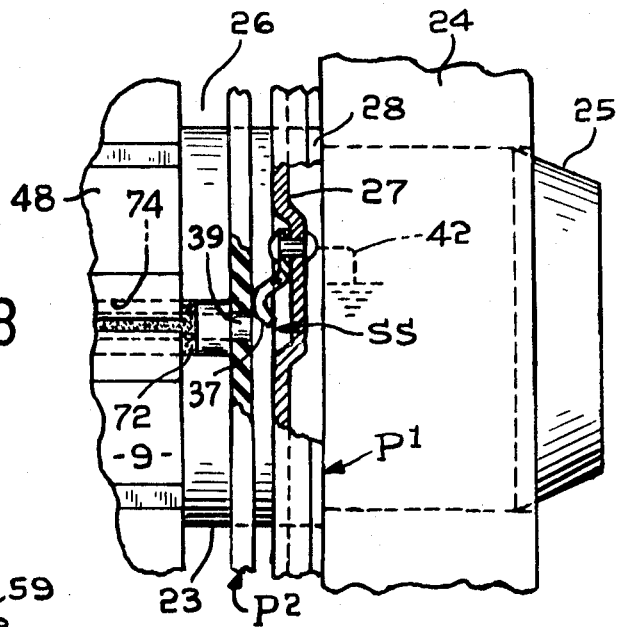
FIG. 8
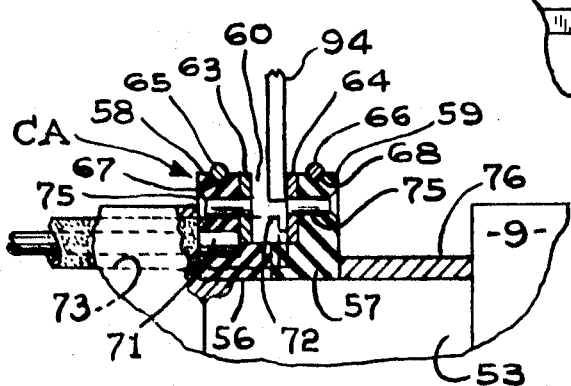
FIG. 9
Inventor

SYNCHRONIZING CONTROL SWITCH ADAPTED FOR FRICTION CLUTCH USE

This invention relates to synchronizing mechanism of the general character disclosed in U.S. Pat. No. 3,272,028 granted to me Sept. 13, 1966, and has as a primary objective the provision of novel switch mechanism having its actuatable (drive) elements embodied between the engine flywheel and clutch driven member corotatable with the driven (output) shaft for simplification and more efficient operation.

A further object is to provide a synchronizing switch device embodying a pair of juxtaposed relatively rotatable contact-carrying plates mounted for corotation with the engine flywheel and for limited relative rotation by said clutch driven member, respectively, said plates being adapted to carry two pairs of cooperating contacts which alternately bridge (connect) in response to change in the relative speed of said clutch member with respect to engine speed incident to speed-changing operations of an associated change speed gearbox prior to lockup engagement of the clutch.

Another object is to effect synchronous operation of the engine and clutch driven member while disengaged in response to relative (asynchronous) rotation of said engine and clutch member to selectively connect said pairs of cooperating contacts according the relative speed of the clutch member being less or in excess of that of the engine, and thereby activating throttle closing and opening means associated with the carburetor butter-fly valve to modulate engine speed accordingly into synchronism with that of the clutch member prior to lockup of the clutch for resumption of vehicular drive without lurching.

Another more specific object of my invention is to provide such a switch mechanism with a collector device having tow insulated rings in frictional (wiping) engagement with a pair of brushes, respectively, connected to terminal posts, said device being mounted coaxially on said clutch driven driven shaft in longitudinally spaced relation with respect to said switch plates, and a pair of insulated conductors interconnect one of each pair of cooperating switch contacts, respectively, with its proper collector ring, said conductors being carried in diametrically opposed longitudinal channels (bores) formed in said driven shaft in spaced relation to the axis thereof.

In a still more specific sense, my invention is operatively related with the conventional spring-engageable friction clutch interposed in the vehicle drive line between the engine flywheel and the aforesaid gearbox (transmission), when said clutch is open (disengaged to accommodate a speed change in said gearbox whereby any relative movement (rotation) between the engine flywheel (clutch driving member) and that portion of the drive line defining the driven shaft which projects into said gearbox, is effective to induce the synchronizing switch mechanism to take up a position, for example, which closes one pair of said cooperating switch contacts connected to an electric circuit energizable to actuate said throttle closing means (solenoid) to thus reduce engine speed during an upshifting speed-change into synchronism with the speed of the driven shaft; but, if the speed of the driven shaft is greater than engine speed upon completion of a downshifting speed-change, then the switch mechanism would take up an opposite relative position to effect closure of the other pair of cooperating switch contacts and thereby energizing the circuit which controls said throttle-opening means (solenoid) to increase engine speed substantially to that of the driven shaft prior to lockup of the clutch for resumption of vehicular drive.

With these and other objects and advantages in view, the invention consists of the new and novel combinations, constructions, and arrangements of the parts as more fully described hereinafter, set forth in the claims appended hereto, and disclosed in the accompanying drawing forming part hereof, and wherein:

FIG. 1 is a schematic representation of an electrovacuum clutch control system similar to that disclosed in my earlier filed application now U.S. Pat. No. 3,272,028, in which my novel and improved synchronizing switch mechanism (device) is embodied, the various control components being shown in operative conditions corresponding to completion of an upshifting operation of the gearbox from low to intermediate drive, the clutch engaged, and vehicular speed at or above 5-—7 m.p.h. effective to open the governor switch driven from the tailshaft of said gearbox;

FIG. 7 is a fragmentary enlargement of FIG. 2 for clarifying the structure comprising the pair of switch contacts adapted to control upshifting synchronization, and shown in normally closed disposition.

Figure 2:
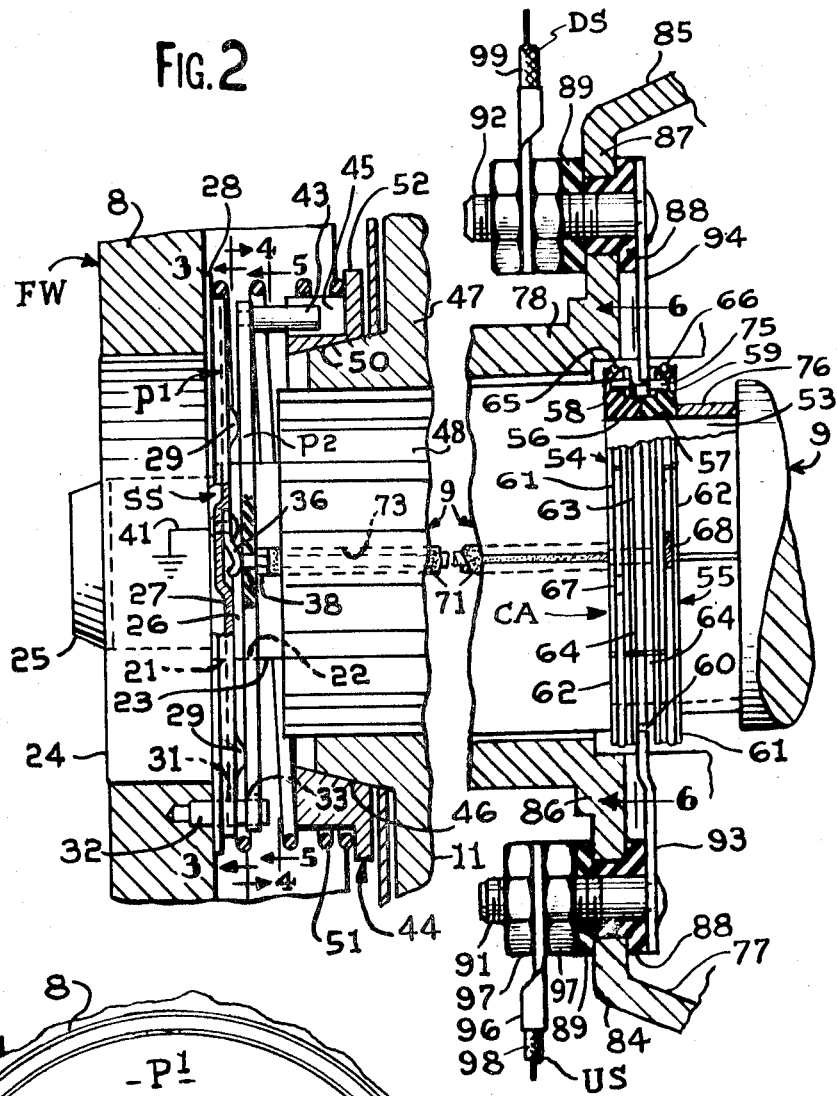
FIG. 2 is a vertical-longitudinal section of the synchronizing switch operatively relater with the engine flywheel and clutch driven member connected to the output shaft, said section being taken on an enlarged scale to clarify the structural details.

FIG. 8 is another fragmentary enlargement similar to FIG. 7 but taken from the opposite side of FIG. 2 for clarifying the structure comprising the pair of switch contacts adapted to control downshifting synchronization, and shown in normally open disposition; and FIG. 9 is another fragmentary enlargement taken from FIG. 2 for clarifying the structure comprising the collector ring assembly, and particularly showing the upshifting and downshifting conductors carried by the clutch output shaft and their respective electrical connections with the conductive collector rings.

This invention has particular use and value in connection with motor vehicles and the like having the known forms of spring-engageable clutches operatively incorporated in the vehicle drive line between the engine flywheel and driven member of the clutch. Also in a broader patent sense, the invention has special adaptation to the control of engine speed through the instrumentality of carburetion regulating means associated with the carburetor to lower or increase engine speed automatically and irrespective of accelerator treadle operating position, in response to change in relative rotative speed of the clutch output shaft connected to said driven member, when the clutch is disengaged, to bring about substantially synchronous speeds of said engine and shaft prior to firm engagement of the clutch friction members upon upshifting and downshifting the associated change speed gearbox, such change in the rotative speed of said shaft being a function of the aforesaid shifting operations.

It will be understood from the description to follow that the cycle of a synchronizing operation and various features of my improved synchronizing switch device are clearly adaptable to control assemblies for speed synchronization of a pair of relatively rotatable members other than the foregoing. This cycle relates to the control of operative energization of a power-mechanism responsive to movement of a pair of operator-operated members, such as the disclosed accelerator treadle and change speed shifting mechanisms, for declutching and synchronously clutching a pair of frictionally-engageable members for smooth resumption of torque transmission at maximum efficiency.

Referring now to the drawing wherein like characters of reference identify like and corresponding parts in the several views, the illustrative embodiment of my invention is disclosed in operative association with an electrovacuum clutch control system of the general character disclosed in my earlier filed application above referred to.

Figure 1A:
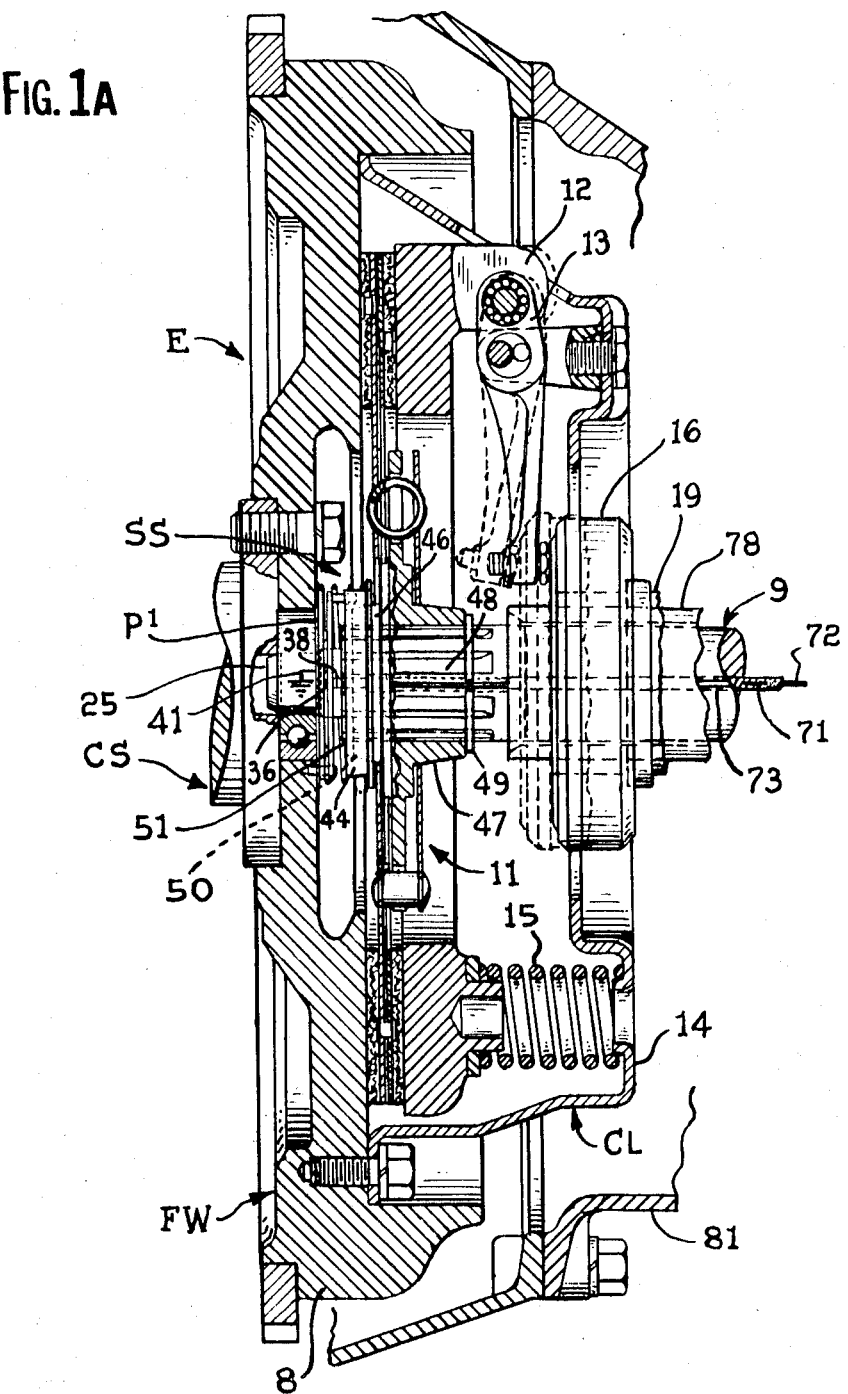
FIG. 1A is a vertical-longitudinal section of the conventional spring-engageable clutch in which is embodied my novel and improved synchronizing switch and the actuating mechanism therefor.

FIGS. 1, 1A and 2 disclose an automotive internal-combustion engine fragmentarily indicated at E by a portion of its crankshaft CS, intake-manifold IM, and carburetor CR including the flywheel FW which incorporates a spring-engageable friction clutch generally designated CL of conventional construction and operation, the latter being adapted when engaged to connect the engine to the change speed gearbox indicated generally by the reference character GB applied to fragmentary portions of its housing and gear train contained therein, and through which the road wheels (not shown) of the vehicle are driven at different gear ratios as is well-known in the art.

The clutch CL illustrated in FIG. 1A is essentially characterized by a driving member 8, a driven output shaft 9, a driven member 11, an annular pressure-applying member 12 corotatable with said driving member 8, a plurality of clutch-operating (disengaging) levers 13 radially arranged and pivotally mounted intermediately on a clutch cover 14 fixed to the flywheel FW as shown, to operate said pressure plate, a plurality of normally compressed clutch-engaging springs 14 operatively positioned between said cover and the pressure plate 12, and a clutch throwout bearing 16 adapted to act on the inner ends of said levers which are pivotally connected at their outer ends to withdraw said pressure plate in opposition to reaction from said springs and thereby disengaging said clutch as is understood.

A bellows-type vacuum-servo VS (see FIG. 1) encircles said output shaft in coaxial relationship thereto, and comprises a stationary end wall (head) 17 and a movable power-member (wall) 18, the latter wall including a tubular work-performing member 19 which engages said throwout bearing to operate said disengaging levers 13 to effect clutch-disengagement.

Figure 3:
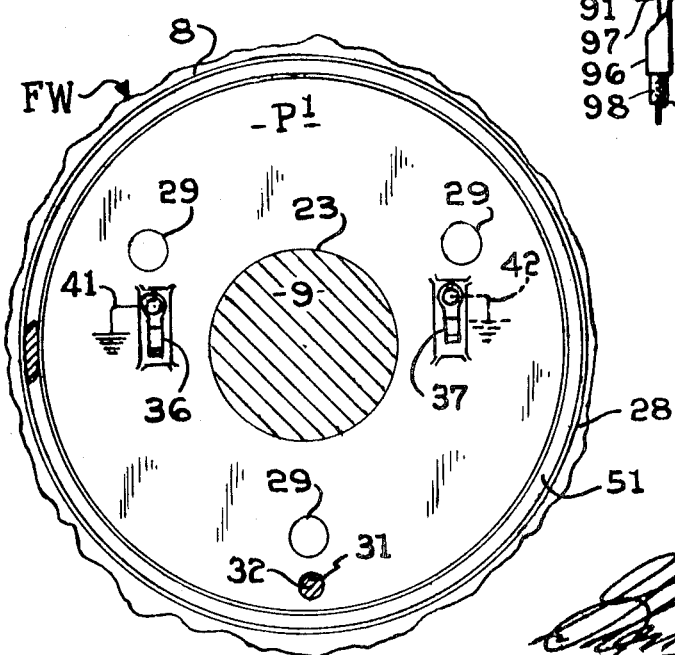
FIG. 3 is a transverse sectional view taken along the line 3-3 of FIG. 2 showing details of the switch actuating (drive) plate and pair of switch contacts carried thereby.
Figure 4:
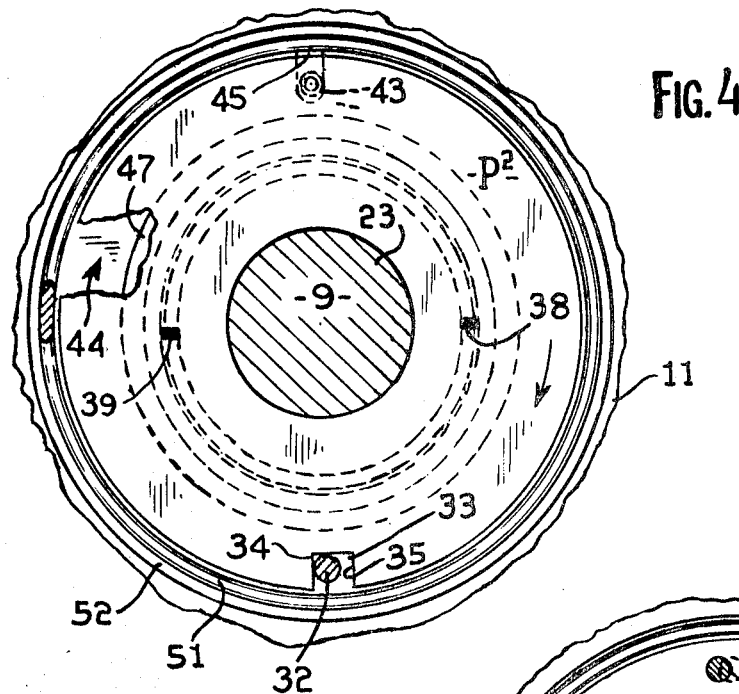
FIG. 4 is another transverse sectional view taken along the line 4-4 of FIG. 2 showing the forward face of the switch actuating (driven) plate and pair of switch contacts carried thereby in positions to control upshifting synchronization.

As best shown in FIG. 2, my novel and improved synchronizing switch mechanism (device) generally designated SS, is operatively incorporated between the driving and driven members of the clutch CL in coaxial encircling relationship with respect to the output shaft 9, and which comprise first and second rotatable elements herein disclosed as a pair of juxtapose circular plates generally designated $P^1$ and $P^2$, respectively, having coaxial circular openings 21, 22, respectively, through which a forward smooth portion 23 of the reduced diameter the output shaft passes and thereby serving as a bearing support for said pair of switch plates in spaced juxtaposition with respect to the rear side of the bearing 24 in which another stepped smooth terminating portion 25 of the output shaft is piloted. Accordingly, the pair of actuatable switch plates is operatively positioned on the shaft portion 23 in the annular space 26 between the flywheel FW and driven member 11 corotatable with the output shaft 9. The first place $P^1$ may be termed a "drive" plate and is formed cup-shaped by a vertical (bottom) wall 27 and an offset out-turned annular flange 28 defining the periphery thereof, the forward side of said flange 28 abutting the confronting face portion on the flywheel being effective stabilize said plate in parallel relationship to the rear face portion of said flywheel. A plurality (preferably three in number) of circular dome-shaped embossments 29 is extruded from said vertical wall 27 in a direction opposite said flange. These embossments are equally spaced circumferentially in radially spaced relationship with respect to the axis of said output shaft 9. A circular aperture 31 extends through the peripheral portion of said wall adjacent the inner side of said flange 28, and which receives a pin 32 projecting from the inner face of the flywheel FW to connect the latter and said plate $P^1$ to rotate as a unit best shown in FIGS. 2 and 3. Juxtaposed on the right side of plate $P^1$ is the second (driven) plate $P^2$ formed as a circular disc composed of insulative nonconductive material and which is disposed contiguously to the crowns of said embossments therefore in axially spaced relationship to the first plate $P^1$, engagement said embossment crowns by said second plate serves to maintain said switch plates in spaced parallelism. The second late $P^2$ is also provided with a cutout 33 having spaced radial shoulders 34, 35 in its peripheral marginal portion through which said pin passes, said cutout being wider than the diameter of said pin to accommodate relative rotative movement in both direction of said driven plate $P^2$ relative to the drive plate $P^1$ depending on which of the clutch friction members, i.e., the flywheel or driven member of the clutch CL is rotating faster than the other. Accordingly, when the second plate $P^2$ takes up the position shown in FIGS. 2 and 4 which corresponds to the operating position of the second plate is induced by relative rotation of the clutch driven member 11 with respect to the flywheel FW in response to relative underspeed of the second plate with respect to the first plate $P^1$, the cutout shoulder 34 abuts the pin 32 as shown in FIG. 4. This last-mentioned position enables reduction of engine speed to match substantially the speed of the clutch member 11 as in the case of upshifting the gearbox GB while in the case of performing a downshift, the gearbox GB requires increase in engine speed to match substantially that of the drive member 11 to actuate the second plate $P^2$ to take up its opposite rotative position of control shown in FIG. 5 wherein the cutout shoulder 35 abuts the opposite side of the pin 32, and, due to the relative rotation of the plates prior to synchronism becoming effective between the driving and driven clutch members whether upshifting or downshifting the gearbox GB, the first plate $P^1$ and second plate $P^2$ adjust automatically according to the signal from the gearbox shifting control to establish the synchronizing switch SS in its selective closed condition and thereby operatively controlling energization of the connected throttle-plate solenoid; that is, solenoid $S^b$ to reduce engine speed or solenoid $S^a$ to increase engine speed.

The first plate $P^1$ carries a diametrically spaced pair of depending fixed electrically conductive contacts 36, 37 preferably formed from spring metallic strips, and the second plate $P^2$ carries a pair of electrically conductive contacts 38, 39 movable therewith as a unit in confronting and similarly spaced relation to the pair of flexible contacts, respectively, for selective cooperation and thereby alternately bridging said pairs of contacts 36, 38 and 37, 39. The degree of switch-closing sensitivity for a corresponding movement of the flywheel FW is defined by the radial location of said contacts with respect to the axis of the output shaft 9.

Figure 5:
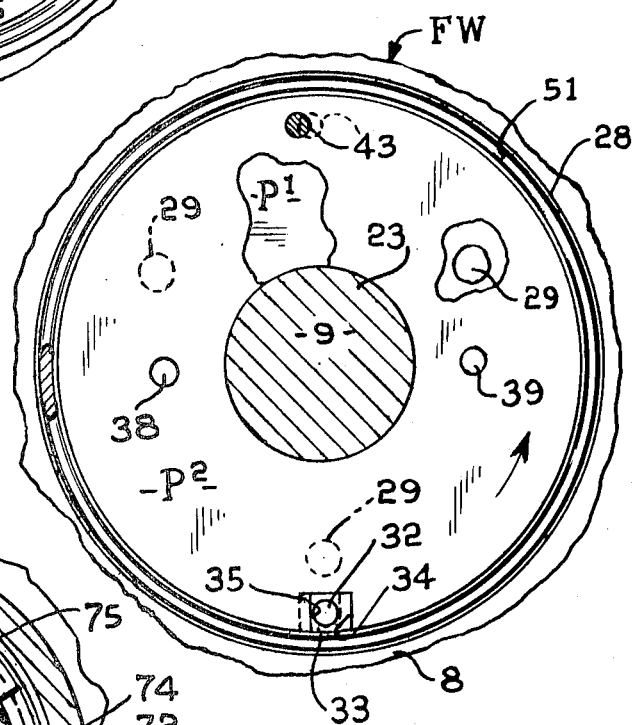
FIG. 5 is another transverse sectional view taken along the line 5-5 of FIG. 2 showing the rear face of the switch driven plate moved to control downshifting synchronization.

Reference is again made to the disposition of the second plate $P^2$ in FIG. 5 wherein the dashed line positions of the structure correspond to the solid line positions shown in FIG. 4 thus this sectional view displays a moved position of the second plate $P^2$ in order to display its relative position with respect to the pin 32 and shoulder 35 of the cutout 33 to control downshifting synchronization of the flywheel FW and clutch driven member 11.

In the normal upshifting disposition of the switch actuating plates $P^1$ and $P^2$, contacts 36, 38 are bridged and the downshifting control contacts 37, 39 unbridged best demonstrated in FIGS. 7 and 8, respectively. The flexible contacts 36, 37 provide grounds at 41, 42, respectively, with the conductive plate $P^1$ therefore with the vehicle structure whereby closure of the upshifting control contacts 36, 38 completes an associated electric circuit US, and closure of the downshifting control contacts 37, 39 completes an associated electric circuit DS as shown in FIG. 1 wherein deenergized circuits are displayed in dashed lines and energized circuits in solid lines.

A pin 43 projects from the peripheral margin of the second plate $P^2$ toward the right as viewed in FIG. 2 to serve as a drive connection to a annulus herein disclosed as a brake ad drive element 44 which for flexibility in terminology maybe termed a "ring" or "Cone," by means of engagement with a cutout 45 formed in the normal peripheral portion of said drive element 44 which is frictionally mounted on the forward exterior conical surface 46 formed on the forward portion of a hub 47 defining the central portion of the clutch driven member 11, said hub being splined to the forward splined portion 48 on the clutch output shaft 9 for corotation therewith, and accommodating limited axial floating movement thereto defined by an abutment ring (shoulder) 49 carried by the output shaft 9 and which is spaced from the cooperating end of said hub when the clutch CL is engaged. The drive element 44 is preferably made of synthetic material such as Nylon to minimize wear and maintain substantially uniform frictional coefficient with its mating surface 46 on said hub. A conical friction surface 50 defines the inner face of the drive element 44 and which frictionally cooperates continuously with its complemental surface 46 on said hub 47. The frictional coefficient obtaining between the surfaces 46, 50 is defined by the degree of taper supplemented by a normally compressed spring 51 encircling said drive plates $P^1$ and $P^2$ and reacting between the plate flange 28 and an outstanding circular flange 52 projecting from the periphery of the normal diameter of the brake element 44 as shown, and which also defines the right end face of the latter element, such frictional engagement being of such magnitude so as to rotate the drive element 44 from the clutch driven member 11 to establish the second plate $P^2$ in one or the other of its two operating positions of control whereupon momentary slipping engagement ensues therebetween without disturbing the existent operating position prior to lockup of the clutch CL for transmission of drive torque at maximum efficiency. The aforesaid frictional drive of the element 44 being converted into a braking action to momentarily hold the second plate $P^2$ from slipping relatively to the clutch hub 47 and thereby inducing relative rotation between said plates resulting in the establishment of the secton plate $P^2$ in its selected operating position, the aforesaid slipping engagement between the driven member hub 47 and drive element 44 being effective to prevent interruption of the existent closed contact disposition of the synchronizing switch SS, thus enabling completion of speed synchronism between the clutch drive and driven members prior to lockup thereof. Reaction of spring 51 is substantially uniform against the drive element 44 due to limitation of rearward axial movement when the clutch CL is disengaged as a function of the hub 47 engaging the aforesaid abutment ring 49.

Further considering the function of the abutment ring 49 carried by the clutch output shaft 9, it should be noted that the spring 51 imparts a biasing effect not only against the synchronizing cone 44 to maintain its frictional engagement with the hub 47 but also biases the clutch driven member 11 axially when disengaged, which member carries the friction facings as shown in FIG. 1A, toward the clutch pressure plate. As wear occurs in the facings, the spring 51 moves the driven member 11 axially toward and in engagement with the pressure plate thus modulating the action of the synchronizing spring to such a degree that the frictional coefficient would be adversely affected causing erratic operation of the secondary switch plate $P^2$. Accordingly, the abutment ring 49 serves to limit such rearward axial movement of the driven member 11 when disengaged without interfering with its required axial "-floating" movement so that wear in the forward facing can change the biasing effect of he spring 51 only in such incremental amounts that frictional engagement between the synchronizing cone 44 and hub 47 is substantially constant and uniform.

It is thus seen that the friction drive element 44 serves a two-fold purpose; namely, (1) to frictionally rotate the second plate $P^2$ relatively to the first plate $P^1$ to establish the former plate in operating position to increase engine speed as in the case of downshifting the gearbox GB, and (2) to brake the second plate $P^2$ to enable the first plate $P^1$ to rotate relatively thereto to establish the other operating position of the second plate $P^2$ to reduce engine speed as when upshifting the gearbox GB, but in either case, upon establishing the selected operating position of the second plate $P^2$, the brake and drive element 44 accommodates release of the hub 47 therefore the driven member 11 to momentarily rotate relatively thereto until synchronism becomes effective between the driving and driven clutch members comprising the clutch CL.

Figure 6:
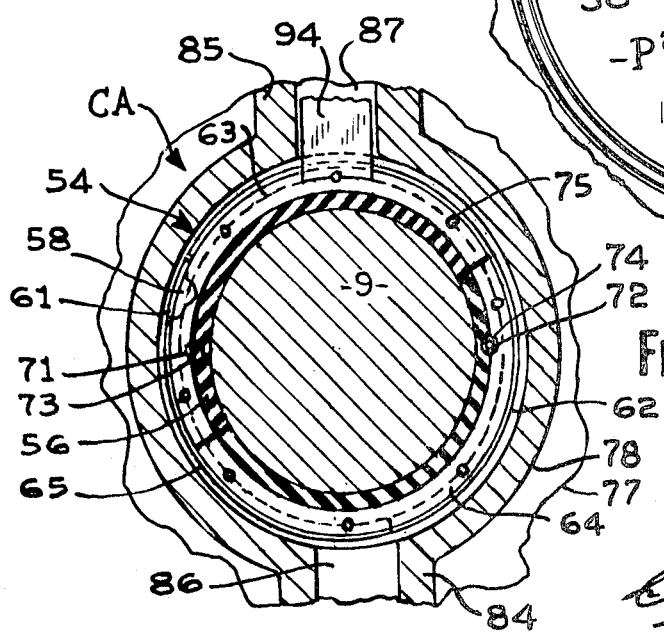
FIG. 6 is another transverse sectional view taken along the line 6-6 of FIG. 2 showing details of the collector ring assembly (device) and its electrical connections with the pair of switch contacts carried by the switch driven plate.

Axially spaced rearward the clutch driven member 11, is an annular space 53 formed in the output shaft 9. This space is adapted to receive a collector ring assembly generally designated CA and which comprises a pair of annular conductive rings 54, 55 in L-shape cross section, each ring being formed of two identical semicircular insulative flanged (legs) 56, 57, respectively, in horizontal disposition and in confronting engagement with two radial insulative flanges (legs) 58, 59, respectively, normal to the first-defined flanges to produce an annular channel 60 therebetween as shown. Therefore, each of the rings is constructed of two identical semicircular sections 61, 62 to enable assembly in the aforesaid annular space as shown, and which in assembled status produce the aforesaid collector rings. The inner confronting faces on each pair of radial flanges are provided with corresponding electrically conductive segments 63, 64 best shown in FIGS. 2, 6 and 9. Thus each ring comprises two semicircular sections and segments aforesaid and in their assembled status shown in FIGS. 2, 4 and 6, a pair of split-type retaining ring 65, 66 is utilized to partially engage the depth of annular grooves 67, 68, respectively formed in the peripheral surface of said radial flanges 58, 59, to stabilize the collector ring assembly CA in the aforesaid space 53 around the output shaft 9 for corotation therewith. It will be noted that the width of the space 53 is greater than the width of the collector ring assembly which is necessary to facilitate installation of the latter on the output shaft in the space provided and connections of its conductive segments 63, 64 to their respective switch contacts 38, 39, carried by the secondary switch plate $P^2$ as shown in FIGS. 2 and 9. These electrical connections are provided by a pair of insulated conductor 71, 72 passing through a pair of channels (bores) 73, 74 formed adjacent the outer surface of the output shaft 9 proper in diametrically spaced relationship. The length of each conductor is such as to span the space between the contacts 38, 39 and confronting faces on the conductive segments aforesaid and thereby connecting the latter to their respective contacts 38, 39 carried by the secondary plate $P^2$. It is thus seen that the limited relative rotation of the latter plate provided by the pin-and-cutout connection 32, 33, is effective to rotate the contacts 38, 39 carried thereby relatively to the flexible contacts 36, 37 and the engaging ends of the conductors 71, 72, respectively, the opposed contact surfaces on the contacts 38, 39 being of such area that the ends of the conductors are in engagement at all times with their respective surfaces while the flexible contacts 36, 37 are so arranged with respect to contacts 38, 39 that selective engagement can be effected, i.e., connection and disconnection without interrupting the contacts' connections via said conductors with their respective collector rings. An optional arrangement of the contacts 38, 39 may be used in lieu of that illustrated and described above and wherein the contact surfaces which cooperate with the forward (left) ends of the conductors 71, 72 may serve for selective connection with said contacts as a function of the limited rotational movement of the secondary plate $P^2$ without interrupting the ground connections of the flexible contacts 36, 37 with their respective opposite contact surfaces on the contacts 38, 39.

The rear ends of the conductors 71, 72 pass through holes in radial flange 58 into contact with their respective annular conductive rings aforesaid to complete the electrical connections between the contacts 38, 39 and their respective conductive rings produces by the two pairs of semicircular conductive segments, respectively, (see FIG. 9). The aforesaid conductive segments are assembled in contact with each other so that the annular conductive ring carries the electric current, and each of these conductive segments is bonded or otherwise attached to its radial flange as by means of a plurality of rivets 75. A split-type stabilizing ring 76 occupies the annular space 53 remaining after installation of said collector ring assembly CA to stabilize the latter against fortuitous movement in contact with the left shoulder of said annular space 53, and also serves to maintain electrical connection with the right ends of said conductors 71, 72.

The collector ring assembly CA is adapted to freely rotate within suitable housing defining the hollow flanged rear end of an elongated tubular throwout bearing support member 78 through which passes the aforesaid work-member 19, said flanged end being fixed to the forward side of the rear end wall 79 of a clutch housing 81 as by cap screws 82, and serves as a bearing and oil retaining means for the forward bearing 83 which supports the output shaft 9 at the point where it passes into the gearbox GB to drive the gear train thereof, said shaft passing freely through said tubular member and flanged portion as shown.

A pair of diametrically oppose portions of the housing 77 is formed as hollow embossments 84, 85 having vertical end walls 86, 87, respectively, each of which is bored to receive a flanged insulative bushing 88, and the outer faces of said end walls are provided with insulative washer 89 coaxial to said bushings. Terminal posts 91, 92 project through their respective bushings and washers to the exterior of said embossments, and the inner ends of said posts carry flexible contacts (brushes) 93, 94, respectively, the latter extending radially inwardly from within said hollows into the aforesaid annular channel 60 in continuous "wiping" engagement with their respective conductive rings formed by the aforesaid pairs of conductive segments 63, 64. Each of the outer threaded ends of said terminal posts receives a locknut 95, a terminal 96, and a jamnut 97 in that order to stabilize said posts on said walled embossments as shown in maintain the brushes in contact with the rotative collector ring assembly CA as is understood. The terminals are provided with leads 98, 99, respectively, for connection to their respective electric circuits US and DS selectively controlled by said switch device SS.

OPERATIONAL SUMMARY

Although the manner in which my novel and improved synchronizing switch device SS achieves its objectives should be manifest from the foregoing description augmented by an inspection of the drawing, a brief restatement is deemed apropos to insure a clear understanding of the novel cooperation and interaction of the various elements and components, and particularly when said device is considered in its operative relationship with a clutch controlling system such as illustrated schematically in FIG. 1. Since this system of clutch control is similar to that disclosed in my earlier filed application, only such details will be described as believed revelant to a clear understanding of the operation of my synchronizing device SS which constitutes the subject matter of the present application.

Referring now to FIG. 1 which discloses an electrovacuum clutch control system generally designated EVS and which embodies the following components in addition to my synchronizing device SS:

a. Gearbox GB in intermediate drive activated condition.
b. Shift-lever controlled switch $IS^1$ at the instant of opening in response to completion of activation of intermediate drive.
c. Governor switch GS open (vehicular speed at or above 5—7 m.p.h.).
d. Accelerator-operated switch AS open (throttle open).
e. Synchronizing switch device SS in upshifting closed disposition of control.
f. Throttle-opening means TO (solenoid $S^a$) deenergized.
g. Throttle-closing means TC (solenoid $S^b$) at the instant of deenergization to enable the throttle-plate to return to open position corresponding to solid line position of the accelerator
h. Interrupter switch IS controlled by the clutch-servo at the instant of opening (clutch CL entering phase of firm engagement under influence of springs 15).
i. Clutch-servocontrol valve SV at the instant of closing thereby venting the servopower-chamber to atmosphere.
j. Clutch CL firmly engaged substantially under spring pressure.

The electric circuits are shown deenergized (broken lines) at the instant of completion of the establishment of intermediate drive in the gearbox GB, therefore certain of the control components may not as yet have completed their cycles under influence of compressed springs 101 and 102, respectively, such as the throttle-closing means TC and solenoid-controlled valve SV, said circuits including a source of electrical energy such as the symbolically illustrated storage battery B having a ground terminal GT and a feeder line (lead) FL connected to its other terminal as shown. A manually-operated master (ignition) switch MS is interposed in the feeder line which is distributed to the relay RY and ignition coil (not shown). An accelerator-controlled switch AS and a governor switch GS driven from the tailshaft of the gearbox, are interposed in series in an accelerator-governor line AGL. The accelerator switch AS interconnects the feeder line with one end of an energizing coil for the armature 103 of said relay RY, and a shift-lever controlled interrupter switch $IS^1$ also connected the feeder line to said relay coil and with the upshifting branch US of a synchronizing circuit SC, the said relay being adapted to control a relay circuit RC having the aforesaid interposed solenoid-operated shutoff valve SV. And, as previously explained, the upshifting circuit US of the circuit SC is connected to the feeder line FL as shown in this FIG., said circuit US including the throttle-closing solenoid $S^b$, interrupter switch IS and synchronizing switch contacts 36, 38, and the downshifting circuit DS includes the throttle-opening solenoid $S^a$, interrupter switch $IS^1$ and synchronizing switch contacts 37, 39.

Assuming the clutch CL is substantially in firm engagement under reaction from its engaging springs 15 as demonstrated in FIG. 1 due to closure of the solenoid-operated shutoff valve SV under influence of spring 102, and that the operatively related clutch synchronizer switch SS is in its normal disposition wherein the first and second synchronizing plates $P^1$ and $P^2$, respectively, have adjusted to take up their relative upshifting positions of control to complete in part the synchronizing circuit US which includes the throttle-closing solenoid $S^b$, in response to closed-status of the contacts 36, 38. Under these circumstances, the downshifting position of control is disabled due to contacts 37, 39 being separated (see FIG. 8) and, therefore, the synchronizing circuit branch DS which includes the throttle-opening solenoid $S^a$, is broken at this point and also at another point by the open interrupter switch IS corresponding to substantially firm engagement of the clutch CL as shown in FIG. 1. The normal disposition aforesaid of the clutch synchronizing switch device SS results from activation in part of the circuit branch US since normal starting, driving and stopping of the vehicle primarily involve upshifting sequences rather than the occasional downshift for power and/or acceleration as when passing another vehicle or when negotiating rough terrain. For example, in starting the vehicle, engine speed is greater than that of the clutch output shaft 9 due to the clutch CL being open (disengaged) and the output shaft idle. Therefore, as low starting speed becomes engaged, a momentary cessation of power from the engine results as the shift-lever SL is moved from N to L position with normal idling speed being resumed by the engine upon the shift-lever reaching low speed engaged position. Under these conditions of the vehicle, the throttle-closing solenoid $S^b$ is momentarily energized due to the upshift contacts 36, 38 being engaged (closed), an operating status resulting from the relative higher speed of the engine reacting through the synchronizing switch plates $P^1$ and $P^2$ with respect to the idle output shaft 9. In the case of bring the vehicle to a stop momentarily as at a traffic light or to park the same, it will be appreciated that engine speed will be greater than that of the clutch driven member 11 prior to turning off the ignition switch MS which, in effect, will establish the synchronizing switch device SS in position corresponding to idle control of the engine to reduce speed thereof upon completion of the synchronizing circuit branch US in response to upshifting movement of the shift-lever SL. Accordingly, it is evident, that irrespective of which control position the synchronizing switch SS takes up prior to firm engagement of the clutch CL for normal driving of the vehicle, that upon disengagement of said clutch to facilitate a speed-change in the gearbox GB, said device SS will automatically take up the position of control in accordance with the relative speed condition obtaining between the clutch driven member 11 and engine flywheel FW (driving member). That is to say, if engine speed exceeds that of the driven member 11, the upshifting control is automatically conditioned to be effective upon moving the shift-lever SL in the selected upshifting direction, and conversely, if the speed of the driven member 11 exceeds that of the engine E, the downshifting control is activated automatically and immediately following a momentary activation of the idling control $S^b$ to prevent engine racing between speed changes, in accordance with the relative speed condition existing between the clutch driving member (flywheel and pressure plate 12) and driven member 11 as defined by the new active gear ratio effective as a result of moving the shift-lever SL in the selected downshifting direction.

It is thus see that the synchronizing switch SS is effective to automatically reduce engine speed to substantially match that of the driven member 11 during upshifting sequences, and to increase engine speed to substantially match of the driven member 11 during downshifting sequences, such engine idling speed control being rendered effective through operative energization of the throttle-closing solenoid $S^b$, and by the throttle-opening solenoid $S^a$ to increase engine speed, said idling and accelerating speed means being characterized by noninterference with normal carburetor control by the accelerator treadle and connected throttle-plate TP, upon full torque-transmitting efficiency of the clutch CL being restored to drive the vehicle in the active speed established in the gear train of the gearbox GB as is understood.

Considering now the three phases of starting, driving and stopping a motor vehicle equipped with my novel and improved synchronizing switch SS, said phases defining a cycle of normal vehicular operation, and with the components (a) through (j) in their respective stated operating positions as described and shown on the drawing in FIG. 1, the driver prior to starting the vehicle in low gear, closes the ignition switch MS while the shift-lever SL is in N position, then presses the starter switch (not shown) which energizes the engine starter (not shown) and thereby starting the engine, whereupon vacuum (negative pressure) produced in the engine intake-manifold IM is placed in communication with the power chamber 104 of the aforesaid clutch-servo VS to controllably evacuate the air from said chamber thereby rendering pressure differential effective across opposite sides of the movable power member (head) 18 to activate the same with resultant disengagement of the clutch friction members 11, 12. Closure of the ignition switch MS also connects the battery B to the feeder line FL and thus energized the relay RY due to the governor switch GS operating in closed condition with 5-—speed below 5—7 m.p.h., and the accelerator-operated switch AS in normal closed position corresponding to released position of the accelerator treadle shown by dashed lines in FIG. 1, however, this latter switch is operable to open its connected circuit at any released position of said treadle when operating in a throttle-opening direction. The aforesaid energization of the relay RY displaces its armature 103 from its solid line position to its dashed line position to close contacts 105, 106 in opposition to the expansion spring 107 and thereby completing the relay circuit RC to the solenoid S to operate the shutoff valve SV to open position depicted by dashed lines in FIG. 1, and thereby operatively energizing the clutch-servo VS to effect clutch disengagement as is understood.

While the clutch CL is so disengaged preliminary to moving the shift-lever SL into low gear position L, such movement of the lever momentarily energizes the throttle-closing solenoid $S^b$ to idle the engine irrespective of the depressed position of the accelerator treadle if the latter is not already in released idling position demonstrated by its dashed line position in FIG. 1, such idling control being the result of the up shifting contacts 36, 38 being closed in response to relative disposition of the switch actuating plates $P^1$ and $P^2$ but notwithstanding the throttle-plate closing solenoid $S^b$ is thus energized and will continue so until the interrupter switch $IS^1$ is opened upon the shift-lever completing its movement to L position. However, the downshifting control of the synchronizer switch SS can overrule such upshifting control should engine speed drop below that of the SA driven member 11, to activate the throttle-opening solenoid $S^a$ to increase engine speed into substantial synchronism with that of the clutch driven member prior to firm engagement of the clutch CL. These conditions also hold true while effecting a downshifting operation notwithstanding the throttle-closing solenoid $S^b$ is momentarily energized to prevent "engine-racing" as would result from engine speed exceeding that of the driven member 11 upon disengagement of the clutch CL preliminary to movement of the shift-lever SL to its selected downshift position, such momentary idling of the engine irrespective of open-throttle position overrules the effective downshifting control to effect engine idling and which becomes inactivated upon the shift-lever reaching its selected downshift position as a result of the interrupter switch $IS^1$ opening but even before such disabling of the upshifting control occurs the downshifting contacts 37, 39 of the synchronizer switch SS may be closed to inactivate the upshifting control and reactive the throttle-opening solenoid $S^a$ to increase engine speed into substantial synchronism with that of the driven member 11 before the clutch friction members 11, 12 reach maximum torque-transmitting efficiency. Thus, the synchronizer switch SS is operative to modulate engine speed into substantial synchronism with that of the clutch driven member 11 while the clutch friction members are disengaged despite idling control of the engine being effective to prevent "engine-racing" at the instant of the clutch friction members become separated sufficiently to free the engine in response to initial shift-lever movement from any of its five control positions; namely L–R–N–I–H, for the gearbox GB as shown schematically in FIG. 1. Stated differently, the upshifting control may be overruled by the downshifting control and vice versa, despite the shift-lever controlled switch $IS^1$ is in closed condition, to effect adjustments in engine speed into substantial synchronism with that of the clutch driven member 11 prior to the clutch friction members reaching "slipping engagement."

Under the aforesaid conditions, the vehicle may be started in response to driver pressing of the accelerator treadle to open the throttle-plate TP of the carburetor CR to the position corresponding to the solid line position of said treadle. Initial movement of the accelerator treadle, for example, from engine idling position (dashed lines) to its solid line position, operates the switch AS to open position or at any incremental position therebetween or beyond said solid line position to wide open throttle, to break the circuit AGL, and therefore the relay circuit RC which energizes the solenoid shutoff valve SV is interrupted thus enabling the latter to close, that is, block vacuum communication between the intake-manifold IM and the clutch-servo VS, and vent air into the latter to enable the spring-action of the clutch CL to reengage the same. If overengagement occurs as the accelerator treadle is depressed to start the vehicle, the driver would react to halt application of additional pressure on the treadle, and, in fact, the reflex would be to relax the foot with attendant slight withdrawal from the accelerator treadle, or give the treadle a more firm depressing movement to increase engine power to prevent engine stalling. In the former instance, switch AS would be instantly closed to reenergize the shutoff valve SV thus placing the clutch-servo VS in communication with manifold vacuum to separate the clutch friction members to free the engine to avoid possible stalling which would necessitate a restarting cycle. Such disengagement of the clutch CL being effected at any engine accelerating position of the accelerator treadle. Accordingly, complete release of the treadle to engine-idling position, which requires a longer interval of driver reaction, is unnecessary to recover the clutch CL to fully disengaged status, and then a new start of the vehicle can be inaugurated from such existent open-throttle position of the accelerator as would be done when the accelerator treadle is released to conventional idling position on vehicles equipped with prior art power-operated clutches fed into engagement by depressing movement of the treadle.

Since the switch AS is interposed in the same circuit AGL with the governor switch GS, it follows that the above described clutch engaging and 7 control is provided by switch AS while starting the vehicle until vehicular speed reaches approximately 5—7 m.p.h. at which the governor switch GS opens as shown in FIG. 1 to interrupt the circuit. Also, it should be noted that the electromagnetic control of the relay RY is interposed in this circuit, thus when the switch AS or governor switch GS is open or both, the relay RY operates to release its contact armature 103 for movement by its retracting spring 107 to open the contacts 105, 106 interposed in the relay circuit RC and thereby deenergizing the solenoid shutoff valve SV for the clutch-drive VS to release the pressure plate 12 so that springs 15 can effect reengagement of the clutch CL.

With the vehicle underway, accelerator treadle operation in either direction will have no effect on the clutch CL, after vehicular speed has reach 5—7m.p.h. or above as it will be recalled that at such speeds of the governor switch GS it automatically opens as shown in FIG. 1 to render closing and opening of the switch AS ineffective in the normal manipulation of the accelerator treadle in controlling the engine throttle-plate TP. Thus, the clutch CL remains engaged to transmit drive torque to the ground wheels of the vehicle at the effective gear ratio in the gearbox GB as is understood. This completes the starting phase of the vehicle.

The driving phase of vehicular operation is carried out in normal manner, with possible interruptions of up- and downshifting for power and/or acceleration as well as compression power-braking from the engine to properly control the vehicle. The deenergized condition of the upshifting and associated electric circuits is shown in FIG. 1, and the energized condition would be shown in solid lines were any of the circuits operative, it being recalled that all circuits were deenergized when the ignition switch MS is open (off). In the event a downshift is required, for example, between high and intermediate (second) drives for acceleration to pass another vehicle, the driver would move the shift lever from H to I position without removing his foot from the existent driving position of the accelerator treadle. Initial movement of the shift-lever SL as stated would close the interrupter switch IS¹ to complete in part the circuit branch US which includes the throttle-closing solenoid S$^b$, and also the relay circuit RC would be completed by energization of the relay RY to thus energize the solenoid-operated shutoff valve SV for clutch-servo operation to effect disengagement of the clutch CL. Upon the shift-lever reaching I position, the actuating element of the switch IS¹ would engage the corresponding hole in the actuating plate 108 to enable this switch to open under influence of spring bias, thus breaking the circuit to the relay RY and to the upshift synchronizing contacts 36, 38 resulting in deenergization of the throttle-closing solenoid S$^b$, but at this critical point synchronism of engine speed to the rotating speed of the clutch driven member 11 is required to prevent "lurching" of the vehicle as the clutch reengages so that driving may be resumed in the newly established intermediate (second) speed drive. Therefore, at the instant of upshift control of the synchronizer switch SS the latter is disabled, the downshift control activated by closure of contacts 37, 39 results in energization of the throttle-opening solenoid S$^a$ and speed up of the engine into substantial synchronism with that of the clutch driven member 11 and connected output shaft 9 before the clutch driving and driven friction members have reach substantial "slipping" engagement, it being recalled that during clutch disengaged status the interrupter switch IS is closed, thus when the downshift contacts 37, 39 of the switch SS are closed, the downshifting circuit branch DS is completed and remains so until synchronism between the engine and output shaft 9 becomes substantially effective, whereat the speed of the engine slightly "overlaps" the speed of the output shaft and connected driven member 11 to open the contacts 37, 39 and close the upshift contacts 36, 38 of the switch SS, but since the shift-lever operated switch IS¹ has opened in the selected intermediate gear position I, the upshift circuit branch US is not completed notwithstanding the latter contacts were closed in the manner just described. Accordingly, the throttle-closing solenoid S$^b$ is deenergized for normal fuel-mixing control by the carburetor CR as is understood.

When the switch IS¹ opened in the manner just described, the relay RY was deenergized with consequent interruption of the relay circuit RC to the solenoid-operated shutoff valve SV thus closing the latter to block vacuum communication with the clutch-servo VS and to vent the latter to atmosphere via said valve so that the clutch-engaging springs 15 can reengage the clutch members FW, 11, and 12, but this reengaging action is controlled by the needle valve 109 which is manually adjustable to regulate ingress of air into the servo power-chamber 104 of the clutch-servo VS and therefore the rate at which the clutch friction members engage under influence of said springs 15. This delayed, or rather retarded, reengaging action enables the downshift switch contacts 37, 39 to bring the clutch friction members into substantial synchronism before firm engagement occurs, which also holds true in the case of an upshifting operation being effected. That is to say, the clutch CL is rapidly disengaged and slowly reengaged under control of the shutoff valve SV, which retarded rate of reengagement produces smooth torque application without noticeable bumping as the clutch lockup becomes effective after a new drive in the gearbox GB has been established whether an upshift drive or a downshift drive. During this slowed reengaging action, it is important to note the "engine-racing" does not occur between speed changes when the clutch is disengaged since either the upshifting switch 36, 38 or the downshifting switch 37, 39 is effective to adjust engine speed to that of the clutch driven member 11 before lockup occurs.

When up- and down-shifts are made during driving of the vehicle, upon separation of the clutch friction members, the engine will normally speed up, that is, race momentarily which relative speed relationship of the engine to the driven clutch member 11 would activate the upshifting switch 36, 38 to operatively energize the throttle-closing solenoid S$^b$ to idle the engine, but before clutch reengagement occurs the relative speed relationship of the engine and driven member 11 will determine which one of the switches (36, 38) or (37, 39) is ultimately activated before the clutch is restored to fully engaged status as shown in FIG. 1.

It is thus seen from the foregoing description that normal vehicular operation after starting the vehicle includes occasional downshifting and upshifting operations for power and/or acceleration as in passing another vehicle. It is in this driving phase that my novel synchronizing switch SS contributes its benefits and advantages of producing smooth transition between the speed drives of the gearbox GB automatically without driver supervision, such speed transitions occuring during open or closed throttle simulating speed changes of commercial hydraulic automatic drives but with much less mechanism involved and therefore more economical and virtually free of service maintenance.

The vehicle is brought to a stop in conventional manner by merely lifting the foot from the accelerator treadle, applying the service brake and returning the shift-lever SL to the desired position, or optionally the driver may leave the shift-lever in gear if parking so that engine compression power-braking can supplement the normal braking action of the parking brake, particularly in the event the driver fails to apply the parking brake which is often done on leaving the vehicle in its parked location. When the ignition switch MS is turned off, all of the electric circuits become deenergized and the previously described control devices (components) will return automatically to their respective normal positions in readiness for another vehicle operating cycle from starting to driving and stopping.

The present invention is primarily adapted for use with spring-engageable friction clutches of the type under consideration, however, it may be operatively related with other types of clutches such as those requiring fluid pressure for engagement in opposition to spring release (disengagement). Therefore, I desire to make it manifestly clear that my novel synchronizing switch SS may be readily adapted to control a pair of friction elements relatively rotatable asynchronously when disengaged into substantial synchronous speeds prior to corotation thereof.

Further considering the function of the friction brake and drive cone 44 which has continuous frictional engagement with its complemental tapered surface on the hub 47, it is important to note that this friction cone serves a twofold purpose; namely, (1) to drive the connected actuatable switch plates $P^1$ and $P^2$ to one of their relative operating positions of control with respect to the clutch friction members rotating asynchronously, in response to the speed of the driven clutch member exceeding that of the driving members (flywheel and pressure plate 12), and upon establishment of the synchronizing switch SS in such position of control, slipping engagement ensues between said friction cone 44 and the driven member 11 to accommodate a degree of speed "overlap" of the latter with respect to the driving members to insure synchronism between said clutch friction members, and (2) to momentarily brake the actuatable switch plate $P^2$ connected to the friction cone 44 when the speed of the driven member 11 is less than that of the driving members to establish the other operating position of control relatively with respect to the other actuatable switch plate $P^1$, upon establishment of the synchronizing switch SS in such latter position, slipping engagement ensues between said friction cone 44 and driven member 11 to accommodate a degree of speed "overlap" of the driving members with respect to the driven member 11 to insure synchronism of the clutch friction member.

Accordingly, it is seen that the friction cone 44 plays an important role in the operation of the synchronizing switch SS to its two operating positions of control to operatively energize the throttle-closing solenoid $S^b$ and the throttle-opening solenoid $S^a$, by introducing a degree of "overlap" of engine speed reduction or increase with respect to the speed of the clutch driven member 11 to bring about synchronous rotation of the engine and driven member prior to firm engagement of the clutch CL, such momentary overlapping of engine speed being effective to change the operating position of the switch SS from its existent activating position to the other and vice versa without energizing the carbureting modulating devices TC and TO activatable at such positions, respectively, such energization depending on which device was previously active to induce synchronization since under such operating conditions either the clutch CL is fully engaged or the shift-lever SL is in a gear-activating position resulting in opening of the interrupter switches IS or $IS^1$, respectively, to prevent fortuitous energization of said devices when such "overlap" in speed occurs following synchronism.

In the normal operating cycle of my synchronizer device SS, initial disengagement of the clutch CL releases the engine to increase speed momentarily whether the shifting direction is up or down providing the accelerator treadle is in engine-accelerating position, therefore the upshifting switch 36, 38 becomes bridged if not already bridged as a result of a previous upshift-operation, whereupon the switch SS instantly adjusts to synchronize the speeds of the engine and the clutch driven member 11. If, under the latter condition, the engine is rotating faster than the driven member, then the switch SS is activated to operatively energize the throttle-closing solenoid $S^b$ to reduce engine speed to that of the clutch driven member; but if engine speed is slower than the clutch driven member, then the switch SS would be activated to operatively energize the throttle-opening solenoid $S^a$ to increase engine speed to that of said driven member, such cycling of engine synchronizing control ensuing automatically notwithstanding the upshifting phase became initially activated at the instant of clutch disengagement to prevent "racing" in response to initial movement of the shift-lever SL in the selected direction of gear train control. Upon disengagement of the clutch CL reaching a point whereat the clutch driven member is sufficiently free of frictional drag to enable relative rotation between the engine and clutch driven member, the switch SS takes up its proper control position to modulate engine speed into synchronism with that of the driven member 11 before the clutch fully reengages for maximum torque-transmitting efficiency.

The switch SS is maintained in the control position corresponding to whether the previous shifting operation was up or down, that is to say, if the previous speed change was "down," then the switch contacts 37, 39 would remain bridged while driving the vehicle in the previously selected downshift, but if the shifting operation was "up," then switch contacts 36, 38 would remain bridged while driving the vehicle in the previously selected upshift, but upon clutch disengagement the proper pair of switch contacts would engage to enable adjustment of engine speed to that of the clutch driven member 11 before firm reengagement occurs.

It is thus seen that the upshifting operational phase of the switch SS becomes effective even though the downshifting phase may be active at the instant of clutch disengagement to prevent "engine-racing" whereupon the proper operational phase comes into play to synchronize engine speed as required prior to firm engagement of the clutch for smooth resumption of torque transmission to the road wheels of the vehicle, such synchronization being completed between the engine and clutch driven member depending on the direction of shifting the gearbox GB.

From the foregoing, a synchronizing cycle may be summarized as including disengagement of the clutch CL attended by operation of the switch SS to its upshifting phase to prevent "engine-racing" followed by continuation of the upshifting phase of control to effect substantial synchronous engine and driven member speeds, or transition of the switch SS automatically to its downshifting phase of control to effect synchronization if engine speed is less than that of the clutch driven member, said two synchronizing phases being selectively effective during open-throttle operation of the engine with momentary throttling of the engine to reduce speed and thereby preventing "engine-racing" as a function of the switch SS operating in its upshifting phase in response to relative rotation of the engine when the clutch CL is initially disengaged sufficiently to free the engine for synchronization with the speed of the clutch driven member 11.

The preferred embodiment of the invention herein disclosed is believed well calculated to fulfill the objectives above stated, however, it should be appreciated that I do not wish such to be limited to the exact construction and/or arrangement of the parts, since it is evident that modifications, variations and substitutions may be made therein by persons skilled in the art without departing from the proper scope or fair meaning of the subjoined claims.

I claim:

1. In synchronizing mechanism adapted for use in cooperation with a pair of coaxial torque-transmitting elements frictionally-engageable to transmit torque and relatively rotatable when disengaged, the improvement which comprises: a pair of coaxial actuatable members disposed in axially spaced relationship between said friction elements in coaxial relationship therewith, one of said members being corotatable with said one friction element and the other member having relative rotational movements with respect to said one member in opposite directions between two predetermined limits; a mechanical connection between said one member and said one friction element, to effect corotation thereof; a mechanical lost-motion connection between said members for defining the aforesaid limits of relative rotation therebetween; an actuatable brake and drive annulus having continuous frictional engagement with a complemental frictional surface on the other friction element; a different mechanical connection between said annulus and the other member to effect corotational movement thereof and to accommodate relative axial movement therebetween, said annulus being adapted to rotate momentarily as a unit with said other friction element to produce a driving action or a braking action according to relative speed of the later with respect to the one member; spring means including a normally compressed spring reacting between said annulus and a portion of one of said friction elements for maintaining said annulus in frictional engagement with the other friction element irrespective of relative axial adjustments between said members whereby relative overspeed of said other friction element with respect to the one friction element, rotates the other member under said driving action to effect one of its operating positions defined by one of said limits, and relative underspeed of said other friction element with respect to the one friction element, rotates the other member under said braking action to effect its other operating position defined by the other of said predetermined limits; and a control device for completing a current path between said actuatable members and being selectively operable to two operating positions of control in response to said one and other operating positions, respectively, of said other member for selectively controlling the speed of said one friction element into synchronism with the overspeed or underspeed of said other friction element prior to establishment of corotational movement of the two friction elements aforesaid.

2. A synchronizing mechanism as claimed in claim 1 in which said pair of actuatable members comprises a pair of circular rotatable plates provided with coaxial apertures, respectively, plus a torque-transmitting shaft passing through the plate apertures and connected to said other friction element for corotation and a pair of longitudinal channels formed in diametrically spaced relationship in said shaft.

3. A synchronizing mechanism as claimed in claim 2 in which said first-defined mechanical connection comprises a pin 32 projecting from said one friction element through a hole in said one plate.

4. A synchronizing mechanism as claimed in claim 3 in which said lost-motion connection comprises a pin carried by said one friction element and projecting through a circumferentially elongated slot in the other plate, said pin normally being disposed at one end of said slot according to the aforesaid overspeed or underspeed of said other plate.

5. A synchronizing mechanism as claimed in claim 4 in which said control device comprises: an electrical switch and the two operating positions thereof are two circuit-completing positions, respectively, of control selectively effective in response to relative rotational speeds of the one friction element being above or below, respectively that of the other friction element when said friction elements are disengaged, said two circuit-completing positions being so related that when one is completed the other is interrupted thus prohibiting simultaneous completion thereof.

6. A synchronizing mechanism as claimed in claim 5 plus electric circuit means including said switch and a source of electrical energy, said circuit means having two branches adapted to be connected to a speed-regulating means, to operatively energize the same selectively; and a pair of electrical connections.

7. A synchronizing mechanism as claimed in claim 6 in which said electrical switch comprises: a pair of spaced electric contacts having rounds, respectively, carried by said one plate; another pair of spaced electric contacts carried by the other plate and selectively engageable with said first-defined contacts, respectively, in response to relative rotational movement in one direction of said other plate produced as a function of relative overspeed of the other friction element with respect to the one friction element induced by momentary drive effect of said annulus reacting on said other plate to move one of its contacts into engagement with its cooperating contact on the one plate to complete one of said circuit branches, and to relative rotational movement in the other direction of said other plate produced as a function of relative underspeed of the other friction element with respect to the one friction element induced by momentary braking effect of said annulus reacting on said other plate to disengage said engaged contacts and engage the other contact on the latter plate with its cooperating contact carried by the one plate to complete the other circuit branch.

8. A synchronizing mechanism as claimed in claim 7 in which said pair of electrical connections comprises: a pair of insulated electrically conductive elements substantially coextensive with and passing through said shaft channels, respectively, with their corresponding ends in continuous contact with said pair of contacts, respectively, carried by said other plate; an annular channel formed in said shaft in axially spaced relationship with respect to said pair of plates; a collector ring assembly occupying a portion of said annular channel and comprising a pair of rings each being formed with a pair of semicircular insulative segments encircling the bottom of said annular channel and a corresponding pair of segmental electrically conductive elements to produce a pair of spaced confronting conductive rings; means enabling continuous electrical connections between the opposite corresponding ends of said conductive elements and said conductive rings, respectively; an annular groove formed in each of the peripheral surfaces of each pair of insulative segments; a split-type retaining ring adapted to engage a portion of its cross section in said groove to stabilize said collector ring assembly in said annular channel; a split-type axially stabilizing ring adapted to interfit the remaining portion of said annular channel to maintain the axial operating disposition of said collector ring assembly with respect to said first-defined conductive elements; and a pair of stationary brushes having continuous wiping contact with said pair of annular conductive rings, the aforesaid two branches of said circuit means being connected to said brushes, respectively.

9. In synchronizing mechanism adapted for use in cooperation with a torque transmitting friction clutch having a pair of coaxial frictionally-engageable elements relatively rotatable when disengaged, the improvement which comprises: a pair of coaxial actuatable members operatively disposed between said friction elements in coaxial relationship therewith, with one of said members being corotatable with one of said friction elements, and the other member being characterized by relative rotational movements with respect to said one member in opposite directions between two predetermined limits; a mechanical lost-motion connection operably carried by said members for defining said predetermined limits thereof; a mechanical connection between said one friction element and said one member to effect corotational movement thereof; switch mechanism having a pair of electrically grounded contacts carried by said one member, another pair of electrically conductive contacts operatively related with said other member, the latter contacts being adapted to selectively engage said pair of grounded contacts, respectively; a spring-loaded annulus characterized by braking and driving frictional engagement with a complemental coaxial friction surface on said other friction element, said limited opposite relative rotational movements of said members being effective to selectively engage the two pairs of contacts aforesaid as a function of overspeed or underspeed, respectively, of said other member with respect to said one member transmitted by said one and other friction elements, respectively, when disengaged, said annulus being adapted to rotate momentarily as a unit with said other friction element to apply said braking action to the other member to rotate relatively with respect to the one member in one direction during said overspeed function, and to rotate momentarily as a unit with said other friction element to enable said driving action to rotate said other member relatively with respect to the one member in the opposite direction during said underspeed function; and a two-directional mechanical connection between said annulus and said other member for transmitting said braking and driving actions and for accommodating relative axial adjustments therebetween.

10. In synchronizing switch mechanism adapted for use in cooperation with a pair of torque-transmitting frictionally-engageably elements relatively rotatable when disengaged, the improvement which comprises: a pair of actuatable members disposed between said friction elements in coaxial relationship therewith; a brake and drive element having continuous frictional engagement with one of friction elements under influence of a spring load; a lost-motion connection between said actuatable members to provide relative rotational movement between two predetermined limits; a mechanical connection between said brake and drive element and said one friction element to effect corotational movement thereof and accommodate relative axial movement therebetween; a pair of electrically grounded contacts carried by said one actuatable member; electric circuit means including a source of electrical energy and a pair of branches; and a pair of electrically conductive contacts carried by the other actuatable member for selective engagement with their respective cooperating grounded contacts to complete in part said branch circuits, in response to opposite relative rotational movements between said actuatable members effected by relative overspeed or underspeed, respectively, of said one friction element with respect to the other friction element prior to engagement of said friction elements.

11. In synchronizing switch mechanism adapted for use in cooperation with a pair of torque-transmitting frictionally-engageable elements relatively rotatable when disengaged, the improvement which comprises: a pair of actuatable members disposed between said friction elements, one of said members being corotatable with one of said friction elements; a clutch element having continuous frictional engagement with the other friction element, and adapted to rotate therewith momentarily as a unit to produce a braking-action on the other actuatable member; means limiting relative rotational movement of said actuatable members with respect to each other; means interconnecting the clutch element with the other actuatable member to transmit the said braking-action thereto; and switch mechanism operatively carried by said actuatable members to selectively operate from one operating position to another operating position of control to complete a current path between said members in response to relative rotational speeds of the one friction element exceeding that of the other friction element when said friction elements are disengaged.

12. In synchronizing switch mechanism adapted for use in cooperation with a pair of torque-transmitting frictionally engageable elements relatively rotatable when disengaged, the improvement which comprises: a pair of actuatable members disposed between said friction elements, one of said members being corotatable with one of said friction elements; a clutch element having continuous friction element, with the other friction element, and adapted to rotate therewith momentarily as a unit to produce a braking-action on the other actuatable member; means limiting relative rotational movement of said actuatable members with respect to each other; means interconnecting the clutch element with the other actuatable member to transmit the said braking-action thereto; and switch mechanism operatively carried by said actuatable members to selectively operate from one operating position to another operating position of control to complete a current path between said members in response to relative rotational speed of the one friction element being less than that of the other friction element when said friction elements are disengaged.